(12) United States Patent
Lindsay

(10) Patent No.: US 8,730,174 B2
(45) Date of Patent: May 20, 2014

(54) DEVICE AND METHOD FOR RECEIVING INPUT

(75) Inventor: Donald James Lindsay, Mountain View, CA (US)

(73) Assignee: BlackBerry Limited, Waterloo (CA)

( * ) Notice: Subject to any disclaimer, the term of this patent is extended or adjusted under 35 U.S.C. 154(b) by 61 days.

(21) Appl. No.: 13/273,015

(22) Filed: Oct. 13, 2011

(65) Prior Publication Data

US 2013/0093682 A1   Apr. 18, 2013

(51) Int. Cl.
*G06F 3/041* (2006.01)

(52) U.S. Cl.
USPC .......................................... 345/169

(58) Field of Classification Search
USPC .......... 345/173–184, 168–169; 715/762, 764; 178/18.01; 341/22
See application file for complete search history.

(56) References Cited

U.S. PATENT DOCUMENTS

| | | | |
|---|---|---|---|
| 6,121,960 A | 9/2000 | Carroll et al. |
| 6,369,803 B2 | 4/2002 | Brisebois et al. |
| 6,738,079 B1 | 5/2004 | Kellerman et al. |
| 6,750,887 B1 | 6/2004 | Kellerman et al. |
| 7,340,716 B1 | 3/2008 | Chansler |
| 7,479,949 B2 | 1/2009 | Jobs et al. |
| 7,516,400 B2 | 4/2009 | Ovetchkine et al. |
| 7,562,312 B2 | 7/2009 | Rochford et al. |
| 7,730,401 B2 | 6/2010 | Gillespie et al. |
| 7,761,812 B2 | 7/2010 | Ostojic et al. |
| 7,844,914 B2 | 11/2010 | Andre et al. |
| 7,880,732 B2 | 2/2011 | Goertz |
| 7,900,156 B2 | 3/2011 | Andre et al. |
| 7,952,569 B2 | 5/2011 | Hunt et al. |
| 8,325,151 B1 * | 12/2012 | Chan et al. ..................... 345/173 |
| 2008/0120559 A1 | 5/2008 | Yee |
| 2009/0058815 A1 | 3/2009 | Jeon et al. |
| 2009/0237359 A1 * | 9/2009 | Kim et al. ..................... 345/168 |
| 2010/0088639 A1 | 4/2010 | Yach et al. |
| 2010/0182264 A1 | 7/2010 | Hahn et al. |
| 2011/0047459 A1 | 2/2011 | Van Der Westhuizen |
| 2011/0050592 A1 | 3/2011 | Kim et al. |
| 2011/0242138 A1 | 10/2011 | Tribble |

FOREIGN PATENT DOCUMENTS

| | | |
|---|---|---|
| EP | 1466242 B1 | 8/2008 |
| EP | 2214087 A1 | 8/2010 |
| WO | 2010147611 A1 | 12/2010 |
| WO | 2011056462 A1 | 5/2011 |

OTHER PUBLICATIONS

Extended European Search report mailed Dec. 21, 2012, in corresponding European patent application No. 11185722.3.

(Continued)

*Primary Examiner* — Abbas Abdulselam
(74) *Attorney, Agent, or Firm* — Novak Druce Connolly Bove + Quigg LLP

(57) ABSTRACT

A method and device for receiving input are provided. The method involves determining an orientation of a touchscreen. When the orientation of the touchscreen is portrait, the method involves rendering at least one input element organized according to a first set of placement rules. When the orientation of the touchscreen is landscape, the method involves rendering the at least one input element organized according to a second set of placement rules. The second set of placement rules causes each of the at least one input element to be rendered proximate to one of first and second opposite edges of the touchscreen. The device includes a processor and a touchscreen configured to carry out the method.

21 Claims, 16 Drawing Sheets

(56) References Cited

OTHER PUBLICATIONS

Blackberry App World; Compose E-mail Blackberry Playbook App; released Apr. 24, 2012; http://appworld.blackberry.com/webstore/content/105809/?lang=en (Accessed May 18, 2012).

Radial App—The Premiere Thumb Keyboard for IPad. Retrieved Mar. 17, 2011. http://radialappl.com.

Examination Report mailed Oct. 18, 2013, in corresponding European patent application No. 11185722.3.

* cited by examiner

DEVICE AND METHOD FOR RECEIVING INPUT

FIELD

The present specification relates generally to portable electronic devices, and more particularly to a touchscreen device having input elements rendered on the touchscreen.

BACKGROUND

The evolution of computers is currently quite active in the portable electronic device environment. It is now well-known to implement a touchscreen as an input device as part of a portable electronic device. Indeed, there has been a veritable explosion in the number and type of devices implementing touchscreens that are configured to execute various applications on portable electronic devices and other computing environments.

DETAILED DESCRIPTION

Figure 1:
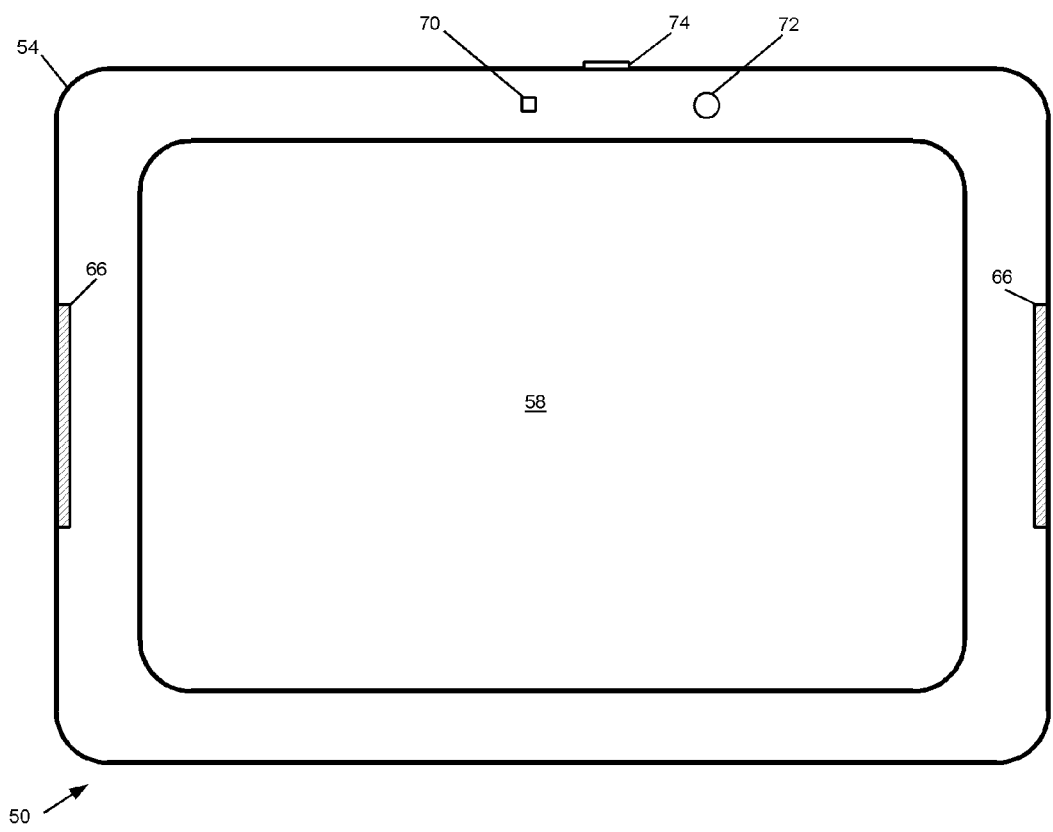
FIG. 1 is a front view of a portable electronic device with landscape orientation according to an embodiment.

In accordance with an embodiment, there is provided a portable electronic device. The portable electronic device includes a processor. The processor is configured to display at least one touchscreen input element in a first input element layout when the touchscreen is in a first orientation. Furthermore, the processor is configured to display the at least one input element in a second input element layout in response to a change to a second orientation of the touchscreen.

The first orientation may be a portrait orientation, and the second orientation may be a landscape orientation.

The processor may be further configured to display a plurality of input elements in the first element layout when the touchscreen is in the first orientation and the second element layout when the touchscreen is in the second orientation.

The processor may be configured to display a first set of input elements in a first area and a second set of input elements in a second area when the touchscreen is in the second orientation The first area and the second area may be positioned proximate to first and second corners of the touchscreen, the first area and the second area may be separated by a space The plurality of input elements may include a keyboard.

The plurality of input elements may further include control elements such as a navigation element, a BOLD function, and a SHIFT.

The processor may be configured to display the control elements proximate the edges, and the processor may be configured to display the keyboard adjacent the controls The portable electronic device may further include an accelerometer configured to detect the change in orientation The processor may be configured to monitor the orientation of the touchscreen.

The processor may be configured to monitor continuously.

The processor may be configured to monitor periodically.

In accordance with another embodiment, there is provided a method a portable electronic device having a touchscreen. The method involves, when the touchscreen is in a first orientation, displaying at least one touchscreen input element in a first input element layout. Furthermore, the method involves, in response to a change to a second orientation of the touchscreen, displaying the at least one touchscreen input element in a second input element layout.

The first orientation may be a portrait orientation, and the second orientation may be a landscape orientation A plurality of input elements may be displayed in the first element layout when the touchscreen is in the first orientation and the second element layout when the touchscreen is in the second orientation Displaying when the touchscreen is in the second orientation may involve displaying a first set of input elements in a first area and a second set of input elements in a second area.

The first area and the second area may be positioned proximate to first and second corners of the touchscreen. The first area and the second area may be separated by a space The plurality of input elements may include a keyboard The plurality of input elements may further include control elements such as a navigation element, a BOLD function, and a SHIFT.

The control elements may be displayed proximate the edges, and the keyboard may be displayed adjacent the controls.

The change in orientation may be detected with an accelerometer.

The method may further involve monitoring the orientation of the touchscreen.

The orientation may be monitored continuously.

The orientation may be monitored periodically.

In accordance with yet another embodiment, there is provided a non-transitory computer readable medium encoded with codes. The codes are for directing a processor to display at least one input element organized in a first input element layout when the touchscreen is in a first orientation. Furthermore, the codes are for directing a processor to display the at least one input element in a second input element layout in response to a change to a second orientation of the touchscreen.

Referring now to FIG. 1, a schematic representation of a non-limiting example of a portable electronic device 50 which is configured for receiving input from a touchscreen, as discussed in greater detail below, is shown. It is to be understood that the portable electronic device 50 is purely exemplary, and it will be apparent to those skilled in the art that a variety of different portable electronic device structures are contemplated. Indeed variations on the portable electronic device 50 can include, without limitation, a cellular telephone, a portable email paging device, a camera, a portable music player, or a portable video player.

Referring to FIG. 1, device 50 comprises a chassis 54 that supports a touchscreen 58. The touchscreen 58 can comprise one or more light emitters such as an array of light emitting diodes (LED), liquid crystals, plasma cells, or organic light emitting diodes (OLED). Other types of light emitters are contemplated. The portable electronic device 50 also comprises speakers 66 for generating audio output. Furthermore, the portable electronic device 50 may also comprise a microphone (not shown) for receiving audio input. Although the example shows two speakers on the portable electronic device, it will now be appreciated, with the benefit of this specification by a person skilled in the art, that any number of speakers may be used. Chassis 54 supports an indicator light 70 for indicating a status of the device. For example, the indicator light 70 may indicate a low battery or that the device is charging. Furthermore, chassis 54 also supports a front optical capture unit 72. For example, the front optical capture unit 72 may be a digital camera capable of capturing images and video, which in turn may be displayed on the touchscreen 58. The chassis 54 also supports an input button 74. For example, the input button 74 may be used to power on or power off the device or to control the volume.

Figure 2:
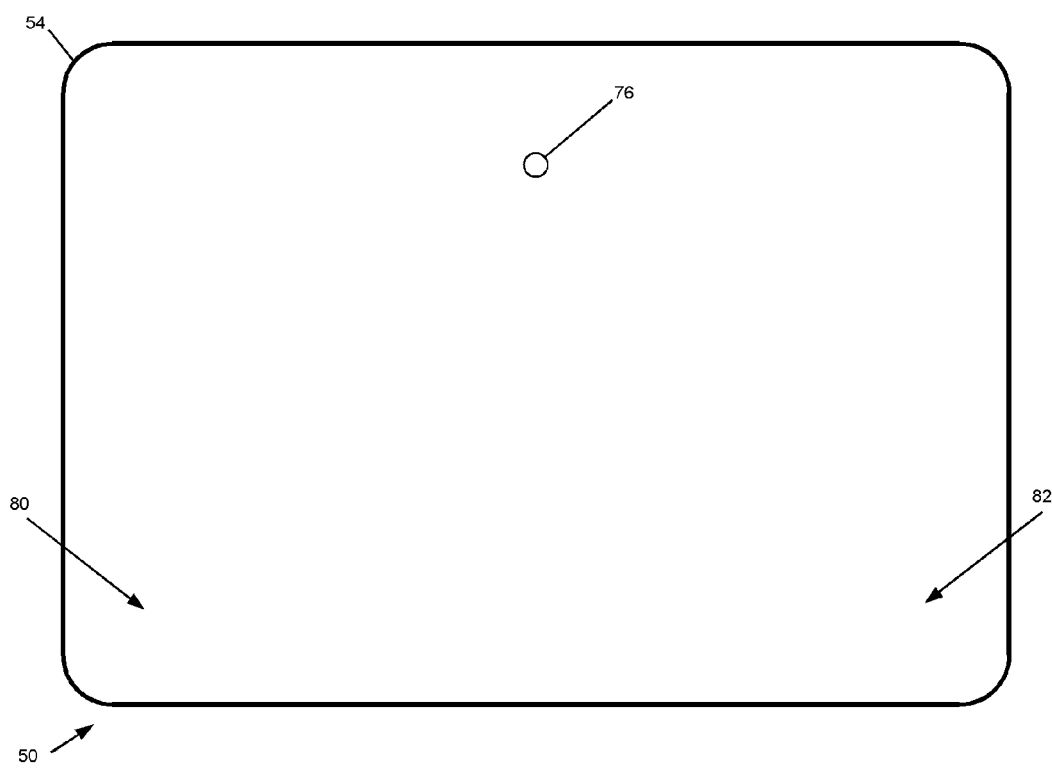
FIG. 2 is a rear view of the portable electronic device shown in FIG. 1.

Referring to FIG. 2, a rear view of the portable electronic device 50 is shown. In FIG. 2, the portable electronic device 50 is also shown as comprising a rear optical capture unit 76. Similar to the front optical capture unit 72, the rear optical capture unit 76 may be used to capture images and video, which in turn may be displayed on the touchscreen 58. Furthermore, as shown in FIG. 2, there are grasping areas 80 and 82 of the chassis 54, where the portable electronic device 50 may be grasped. For example, the grasping areas may be grasped by hands when the portable electronic device 50 is in use.

Figure 3:
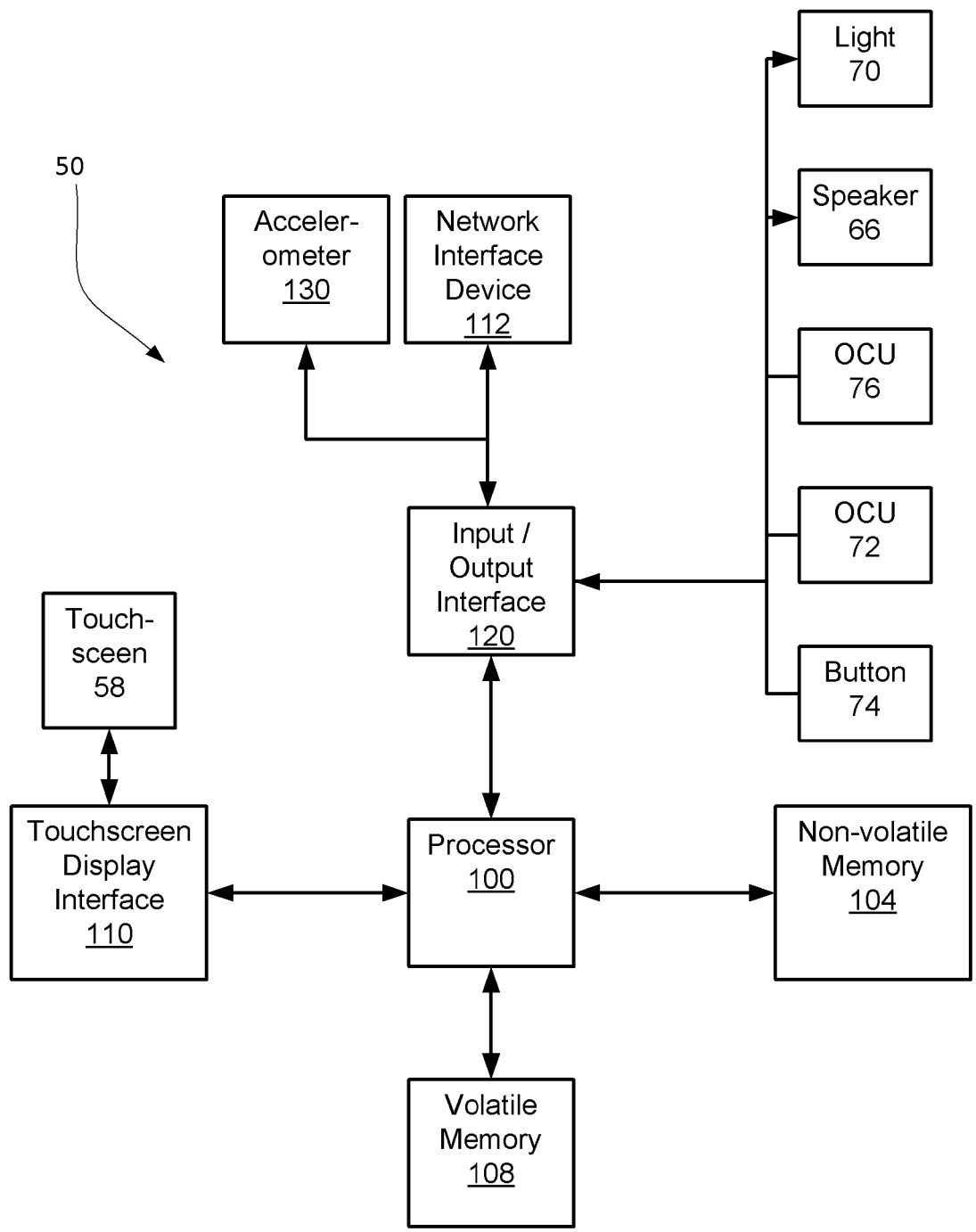
FIG. 3 is a schematic block diagram of the portable electronic device shown in FIG. 1.

FIG. 3 shows a schematic block diagram of the electronic components of the portable electronic device 50. It should be emphasized that the structure in FIG. 3 is purely exemplary. The portable electronic device 50 includes a plurality of input devices which in a present embodiment includes touchscreen 58, input button 74, and front and rear optical capture units 72 and 76. Other input devices are contemplated such as a microphone (not shown). Input from input button 74, and front and rear optical capture units 72 and 76 are received at processor 100 via an Input/Output interface 120. Output to the speakers 66 and the indicator light 70 from the processor 100 is also directed through the Input/Output interface 120. Input from touchscreen 58 is received at processor 100 via a touchscreen display interface 110. Although two separate interfaces are schematically shown, it will now be appreciated, with the benefit of this specification, that any number of interfaces may be used and that the schematic is purely exemplary. Processor 100 can be configured to execute different programming instructions that can be responsive to the input received via input devices. To fulfill its programming functions, processor 100 is also configured to communicate with a non-volatile storage unit 104 (e.g. Electrically Erasable Programmable Read Only Memory ("EEPROM"), Flash Memory) and a volatile storage unit 108 (e.g. random access memory ("RAM")). Programming instructions that implement the functional features of device 50 as described herein are typically maintained, persistently, in non-volatile storage unit 104 and used by processor 100 which makes appropriate utilization of volatile storage 108 during the execution of such programming instructions. Those skilled in the art will now recognize that non-volatile storage unit 104 and volatile storage unit 108 are examples of non-transitory computer readable media that can store programming instructions executable on processor 100.

Processor 100 in turn is also configured to control the touchscreen 58, the indicator light 70 and speakers 66, also in accordance with different programming instructions and optionally responsive to different input received from the input devices.

Processor 100 also connects to a network interface device 112 through the Input/Output interface 120. The network interface device 112 can be implemented in a present embodiment as a radio configured to communicate over a wireless link, although in variants the portable electronic device 50 can also include a network interface for communicating over a wired link. Network interface device 112 can thus be generalized as a further input/output device that can be utilized by processor 100 to fulfill various programming instructions. It will be understood that the network interface device 112 is configured to correspond with the network architecture that defines such a link. Present, commonly employed network architectures for such a link include, but are not limited to, Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers (IEEE) standard 802.11 (Wifi™), Bluetooth™ or any of their variants or successors. It is also contemplated that the network interface device 112 can include multiple radios to accommodate the different protocols that may be used to implement different types of links. In the specific, non-limiting example, the network interface device 112 is configured to provide 3G, Wifi™ and Bluetooth™ links.

Figure 4:
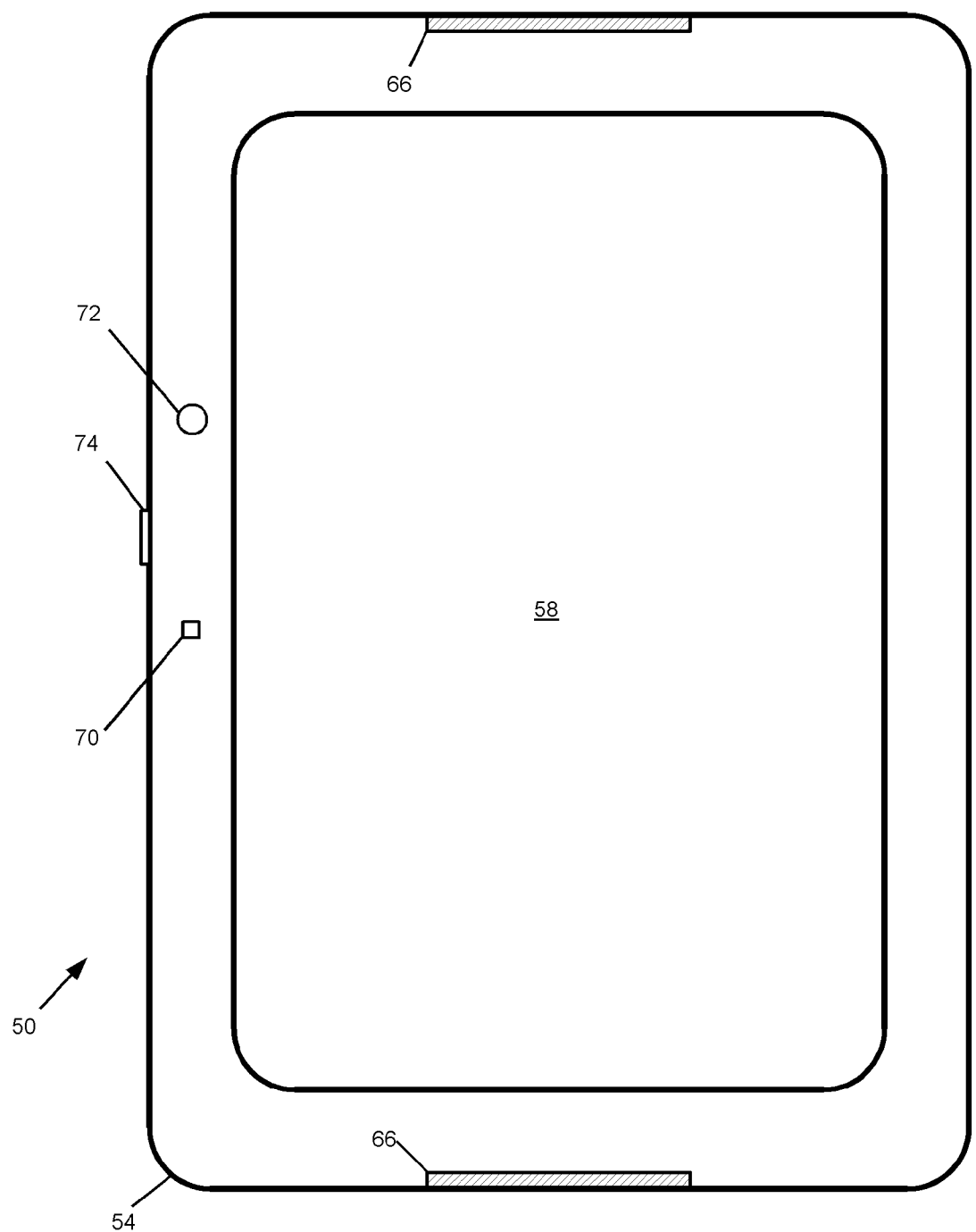
FIG. 4 is a front view of the portable electronic device shown in FIG. 1 with portrait orientation.

Touchscreen 58 may be positioned generally in one of two or more orientations during general use. Although the present embodiment describes only two orientations, more orientations are contemplated. It is also contemplated that the orientation may be a continuum. In the present embodiment, the portable electronic device 50 is operated in one of two orientations. The first orientation is portrait as shown in FIG. 4. When the orientation of the touchscreen 58 is portrait, the width of the touchscreen less than the height of the touchscreen. The second orientation is landscape and is shown in FIG. 1. When the orientation of the touchscreen 58 is landscape, the width of the touchscreen is greater than the height of the touchscreen. It is recognized that portrait and landscape orientations are approximately 90 degrees to each other. Furthermore, it is recognized that the touchscreen 58 will have two portrait orientations and two landscape orientations as the touchscreen is rotated in a complete circle. It is also recognized that there are an infinite number of orientations of the touchscreen 58 and that orientations in between portrait and landscape may have characteristics of both orientations described in greater detail below. In addition, although this embodiment shows a touchscreen with a generally rectangular shape, other shapes are contemplated as well.

In addition, in the present embodiment, processor 100 connects to an accelerometer 130 through the Input/Output interface 120. The accelerometer 130 measures acceleration and may be used to determine the orientation of the touchscreen 58. It will now be appreciated, with the benefit of this specification, that an accelerometer is not the only way in which the orientation of the touchscreen 58 may be detected. Other devices that may be used to detect the orientation including gyroscopes or image analysis of images captured by the optical capture units 72 and 76. In addition, the orientation may be continuously determined by the processor 100, or it may be determined only once, for example, at the startup of the portable electronic device 50.

Figure 5:
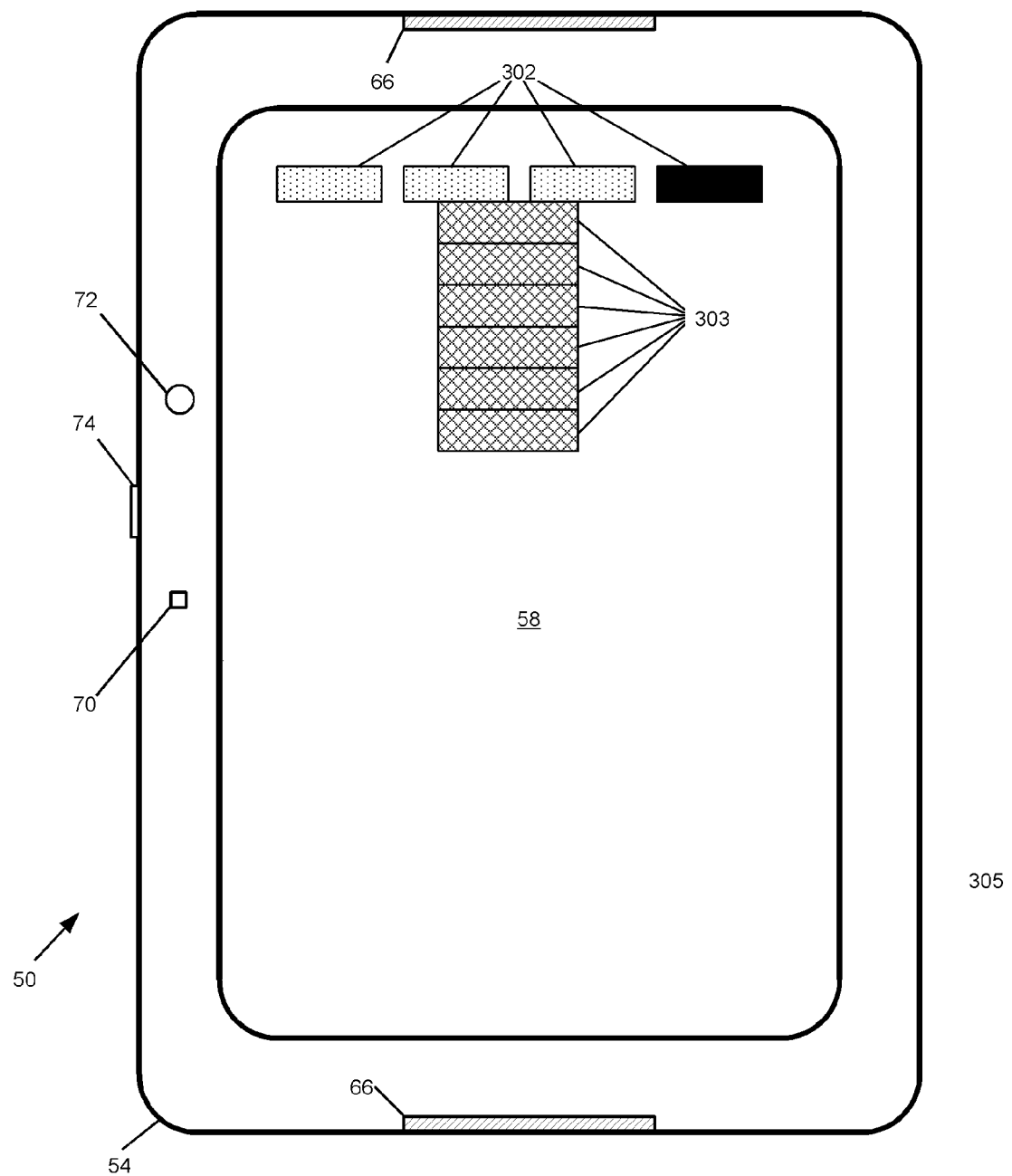
FIG. 5 is a front view of the portable electronic device with portrait orientation showing a input elements in accordance with an embodiment.

Referring to FIG. 5, an embodiment of the portable electronic device 50 is shown. The portable electronic device 50 is shown with a plurality of touchscreen input elements 302 representing menus organized in accordance with a first set of placement rules rendered by the processor to be displayed on the touchscreen 58 when the orientation is portrait. Having the input elements 302 displayed across the top of the touchscreen 58 in this embodiment represents but one possible placement rule. Furthermore, other embodiments may only have a single input element. The first set of placement rules can be generally described by conventional guidelines for placing input elements 302 for application on a mobile device. Conventional guidelines refer guidelines directing the processor 100 render the input elements to be displayed in a particular place on the touchscreen 58 when running a particular application. For example, menu input elements for mobile device applications have conventionally appeared across the top of the screen, where selecting the menu input element causes the processor to render further elements in the form of a drop down menu. In the present embodiment, the input elements 302 each activate a sub-menu having a plurality of input elements 303 associated with various commands. Each of the input elements 302 and 303 are configured to receive input on the touchscreen through any suitable touchscreen mechanisms. The input from the touchscreen 58 is then communicated via the touchscreen display interface 110 to the processor 100.

It is to be understood that the layout of the input elements 302 and 303 according to the first set of placement rules is not limited to any spacing, pitch or shape, and the depiction in FIG. 5 is purely exemplary. For example, the input elements 302 and 303 may be located across the bottom of the touchscreen 58, or in another location completely. Furthermore, input elements may refer to any element for receiving input on the touchscreen 58. Some common examples of input elements include command buttons, icons, application command toolbars, virtual keys of a keyboard, and command menus.

It will now be appreciated, with the benefit of this specification, that on a portable electronic device 50, the space available for rendering images or text to be displayed is limited due to the physical size of the portable electronic device. Therefore, efforts can be taken to reduce the space occupied by the input elements 302 and 303 to provide more space to render other content.

Figure 6:
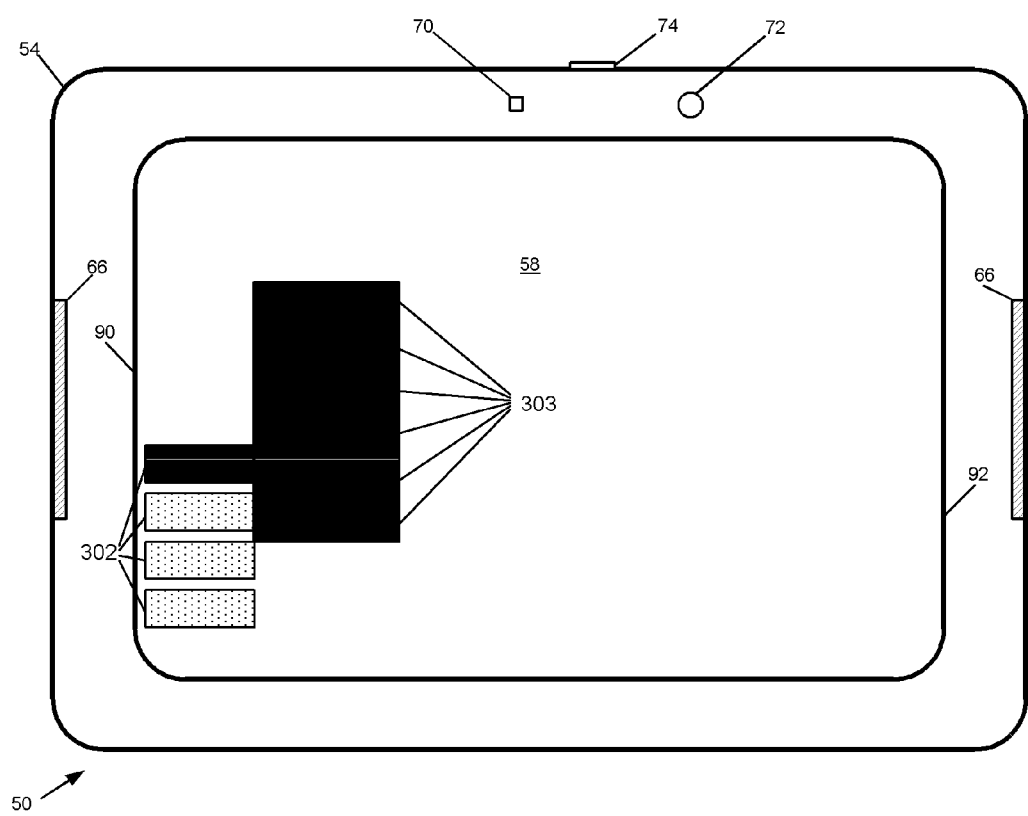
FIG. 6 is a front view of the portable electronic device with landscape orientation in accordance with the embodiment shown in FIG. 5.

Referring to FIG. 6, the portable electronic device 50 is shown with the pluralities of input elements 302 and 303 rendered by the processor to be displayed on the touchscreen 58 when the orientation is landscape. The pluralities of input elements 302 and 303 are located proximate to a edge 90 of the touchscreen 58. In the embodiment shown in FIG. 6, it should be recognized that the pluralities of input elements are the same as those shown in FIG. 5.

It should also be recognized that the pluralities of input elements 302 and 303 are located on the face of the front of the portable electronic device 50 roughly corresponding to the grasping area 82 (not shown), which is located on the back of the portable electronic device. The grasping area 82 is for a hand to grasp the portable electronic device 50 during use. By positioning the pluralities of input elements 302 and 303 in an area on the face of the device 50 above grasping area 82, a thumb of the hand grasping the portable electronic device 50 at grasping area 82 has convenient access to all of the pluralities of input elements 302 and 303 without requiring any repositioning of the hand which is grasping the grasping area 82. Convenient access may be achieved by rendering the pluralities of input elements 302 and 303 to be displayed within the span of a thumb without requiring any repositioning of the hands when the hands are grasping the grasping areas 82.

It will be recognized that although the embodiment shown in FIG. 6 shows the pluralities of input elements 302 and 303 near the edge 90, the pluralities of input elements 302 and 303 may also be rendered near a edge 92. The difference in switching sides would simply be a thumb of a hand grasping the portable electronic device 50 at grasping area 80 will have convenient access to all of the pluralities of input elements 302 and 303 instead of the hand which is grasping the grasping area 82. Furthermore, it is also recognized that the input elements 302 and 303 may be separated such that a portion of the pluralities of the input elements are rendered near that edge 90 and the remaining input elements are rendered near the edge 92 (i.e. the opposite edge).

In addition, it will now be appreciated, with the benefit of this specification, that although most applications involve a plurality of input elements, it is possible that only a single input element is involved.

Figure 7:
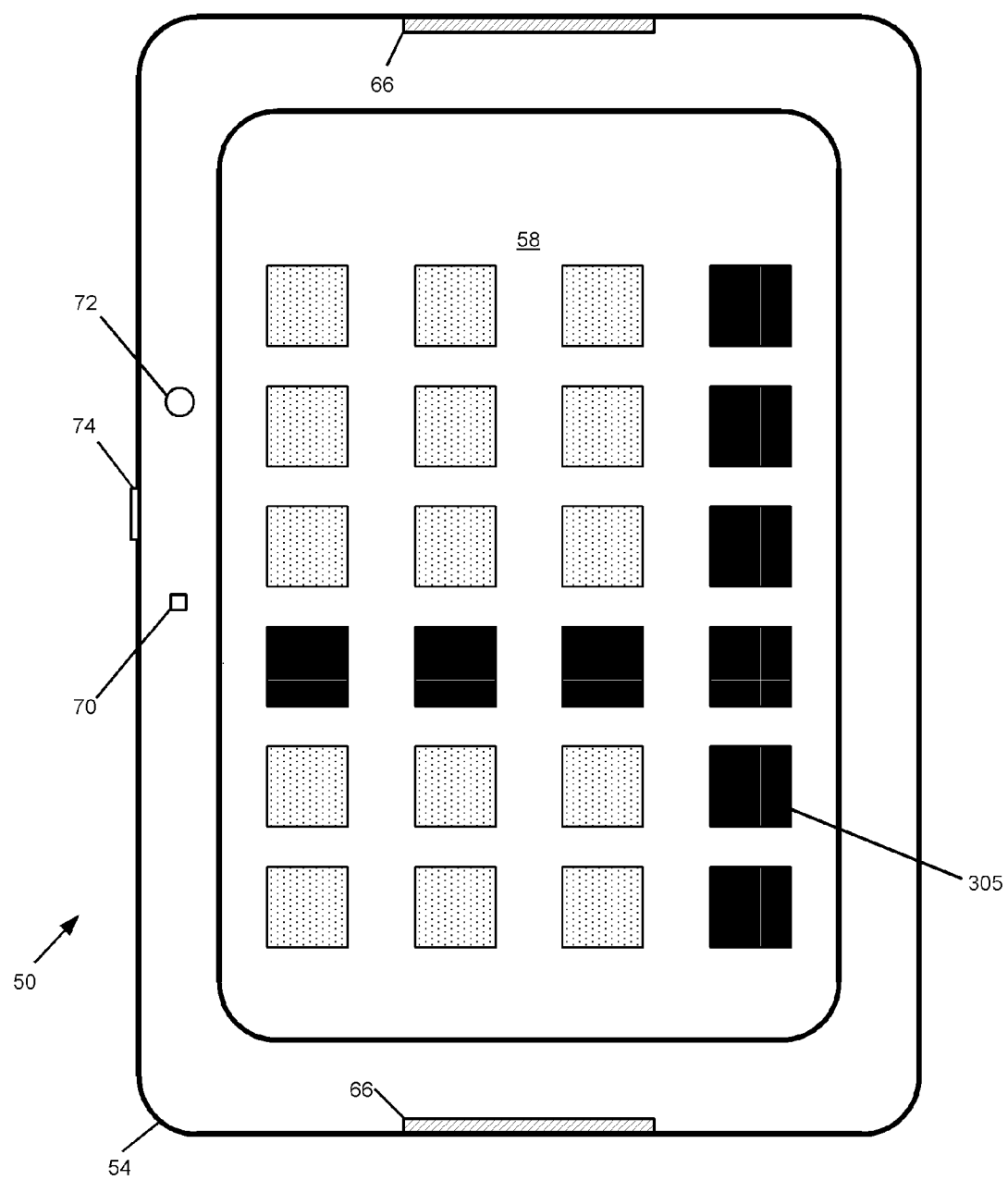
FIG. 7 is a front view of the portable electronic device with portrait orientation showing menu icons in accordance with another embodiment.

Referring to FIG. 7, another embodiment of the portable electronic device 50 is shown. The portable electronic device 50 is shown with a plurality of input elements 305 representing menu icons organized in accordance with a first set of placement rules and rendered by a processor to be displayed on the touchscreen 58 when the orientation is portrait. It will now be appreciated, with the benefit of this specification that the first set of placement rules is generally described by conventional guidelines for placing menu icons on a menu. In the present embodiment shown in FIG. 7, the first set of placement rules cause the menu icons to be organized in a layout wherein the menu icons are evenly distributed. Although the input elements 305 are shown to be evenly distributed in this embodiment, it is not necessary to place the input elements in this layout. However, menu icon input elements for mobile device applications have conventionally been rendered by a processor to be displayed in a grid pattern similar to that shown in FIG. 7. In the present embodiment, the input elements 305 each activate an application associated with the menu icon.

Figure 8:
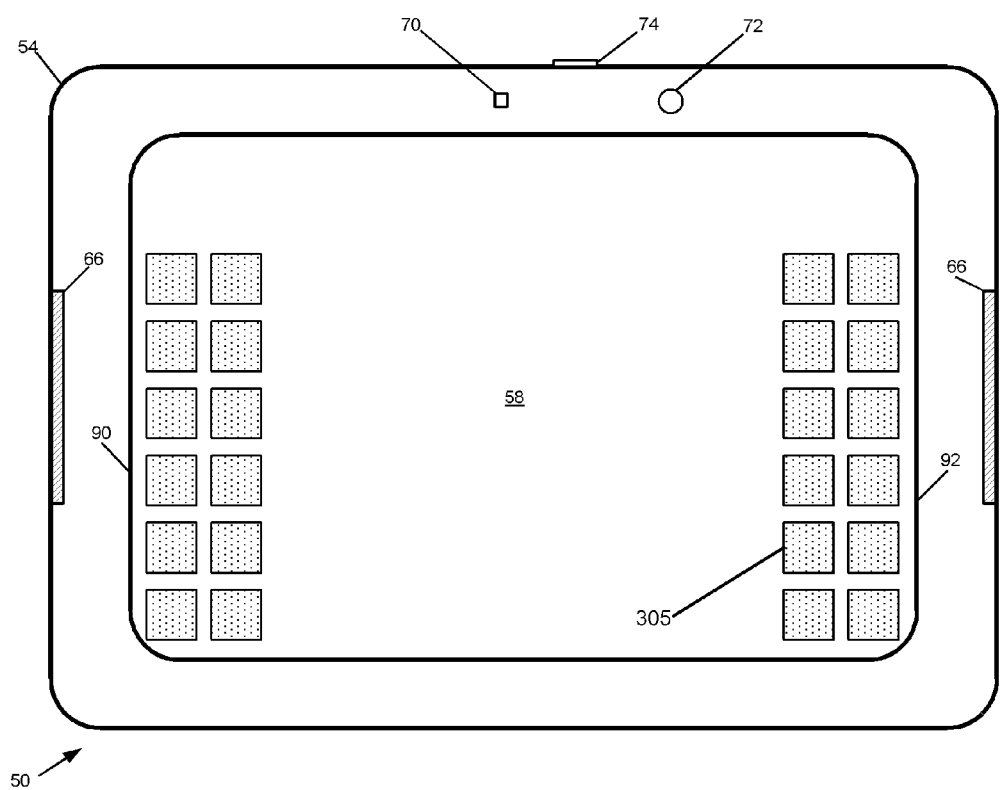
FIG. 8 is a front view of the portable electronic device with landscape orientation in accordance with the embodiment shown in FIG. 7.

Referring to FIG. 8, the portable electronic device 50 is shown with the plurality of input elements 305 rendered by a processor to be displayed on the touchscreen 58 when the orientation is landscape. Portions of the plurality of input elements 305 are located proximate to opposite edges 90 and 92 of the touchscreen 58. In the embodiment shown in FIG. 8, it should be recognized that the input elements 305 are the same as those shown in FIG. 7.

It should also be recognized that by rendering the plurality of input elements 305 near the opposite edges 90 and 92, the plurality of input elements 305 are conveniently located on the face of the front of the portable electronic device 50 roughly corresponding to the grasping areas 82 and 80 which are located on the back of the portable electronic device. The grasping areas 82 and 80 are for hands to grasp the portable electronic device 50 during use. By positioning the plurality of input elements 305 in an area on the face of the device 50 above grasping areas 82 and 80, thumbs of the hands grasping the portable electronic device 50 at grasping areas 82 and 80 have convenient access to each of the input elements 305 without requiring any repositioning of the hand which is grasping the grasping area 82. Convenient access may be achieved by rendering each of the input elements 305 within the span of a thumb without requiring any repositioning of the hands when the hands are grasping the grasping areas 82.

The method for determining which input element 305 will be rendered near which edge 90 or 92 may be carried out in accordance any set of rules. For example, the method may involve dividing the plurality of input elements 305 into two equal portions where each portion includes the same number of input elements as the other. The specific input elements in each portion may be selected based on the proximity of the specific input element to an edge 90 or 92. Other methods of selecting input elements are also contemplated.

It will be recognized that although the embodiment shown in FIG. 8 shows the input elements 305 rendered by the processor to be displayed near opposite edges 90 and 92, the plurality of input elements 305 may also be rendered near only one of the two edges 90 and 92. Furthermore, the portions rendered near each edge 90 and 92 may not be equal in size.

Figure 9:
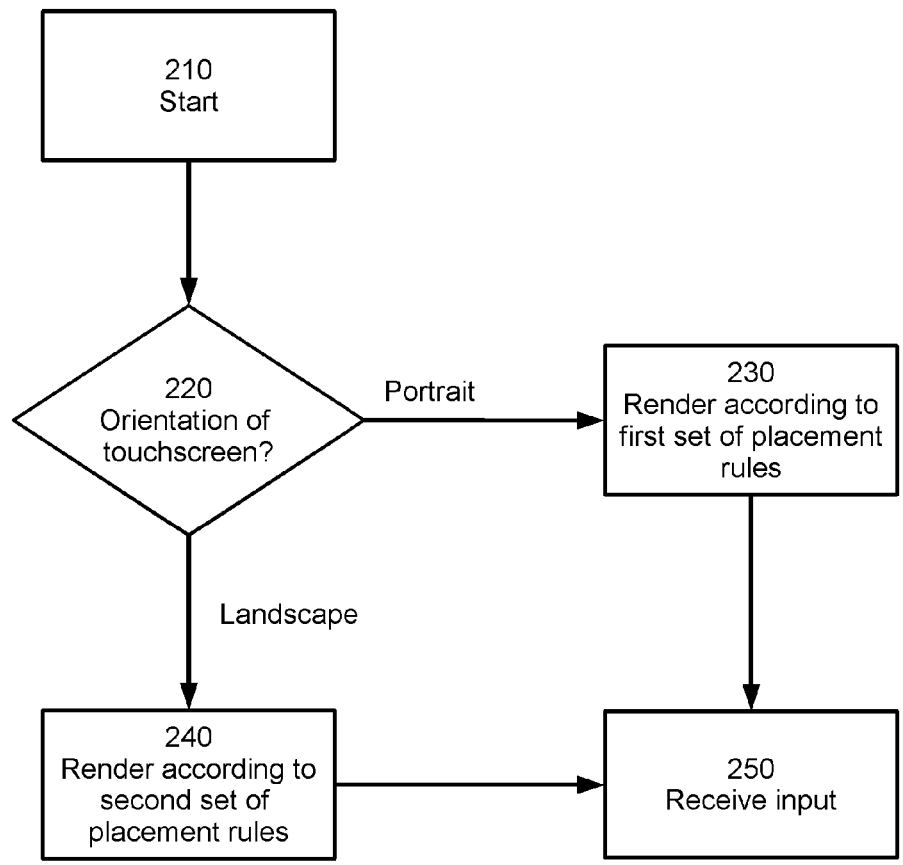
FIG. 9 is a flow chart of a method for receiving input from a portable electronic device in accordance with an embodiment.
Figure 9:

Referring now to FIG. 9, a method for receiving input from a portable electronic device 50 is represented in the form of a flow-chart and indicated generally at 200. Method 200 can be implemented generally as part of the operating system of the portable electronic device 50 or as part of a specific application running on the portable device.

Block 210 is the start of the method 200. The manner in which the method is started is not particularly important. For example, the method 200 may start when the portable electronic device 50 is powered on. Alternatively, the method 200 may also begin when an application is run, or at specific time intervals. It will now also be appreciated, with the benefit of this specification, that the method 200 may also be continuously running such that as soon as the prior run through the method ends, the method will start again. By continuously running method 200, the orientation of the touchscreen 58 is constantly monitored such that when a change in the orientation of the touchscreen is detected, the rendering of the input elements to be displayed will effectively be updated instantaneously. This allows for switching between two modes by simply rotating the personal electronic device 50.

Figure 15:
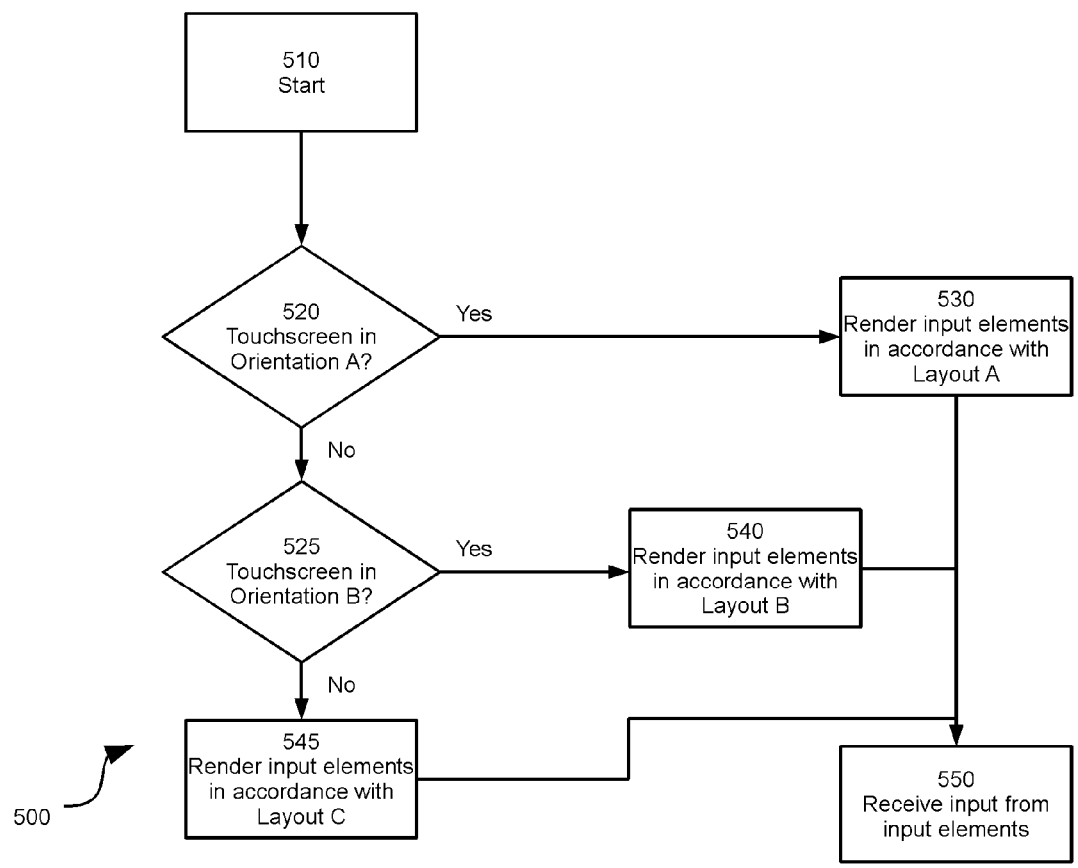
FIG. 15 is a flow chart of a method for receiving input from a portable electronic device in accordance with yet another embodiment.

Block 220 comprises determining the orientation of the touchscreen 58. This determination is made at the processor 100 after receiving input data. Input data is received by the processor 100 from the Input/Output interface 120. Input data may include data from an accelerometer 130 or other sources. A determination by the processor 100 that the orientation is portrait leads to block 230. Alternatively, a determination by the processor 100 that the orientation is landscape leads to block 240. Although the present embodiment shows only two options or the orientation (i.e. portrait and landscape), variants may include more than two options. When more options are implemented, a decision block may be added for each additional orientation supported by the portable electronic device 50. For example, FIG. 15 shows a method involving three orientations.

Block 230 comprises rendering at least one input element organized according to a first set of placement rules to be displayed on the touchscreen 58. Once the at least one input element is rendered, the method 200 ends at block 250 where the processor 100 receives input from the at least one input element. Once method 200 completes block 250, the method has been completed. In some embodiments, the method 200 includes an optional loop back to the start 210 from 250 (not shown) to provide for continuous determination of the orientation.

A "landscape" determination at block 220 leads to block 240. Block 240 comprises rendering at least one input element organized according to a second set of placement rules to be displayed on the touchscreen 58. The second set of placement rules causes the at least one input element to be rendered proximate to one of two opposite edges 90 and 92 of the touchscreen 58. Once the at least one input element is rendered, the method 200 ends at block 250 where the processor 100 receives input from the at least one input element. Once method 200 completes block 250, the method has been completed. In some embodiments, the method 200 includes an optional loop back to the start 210 from 250 (not shown) to provide for continuous determination of the orientation.

Figure 10:
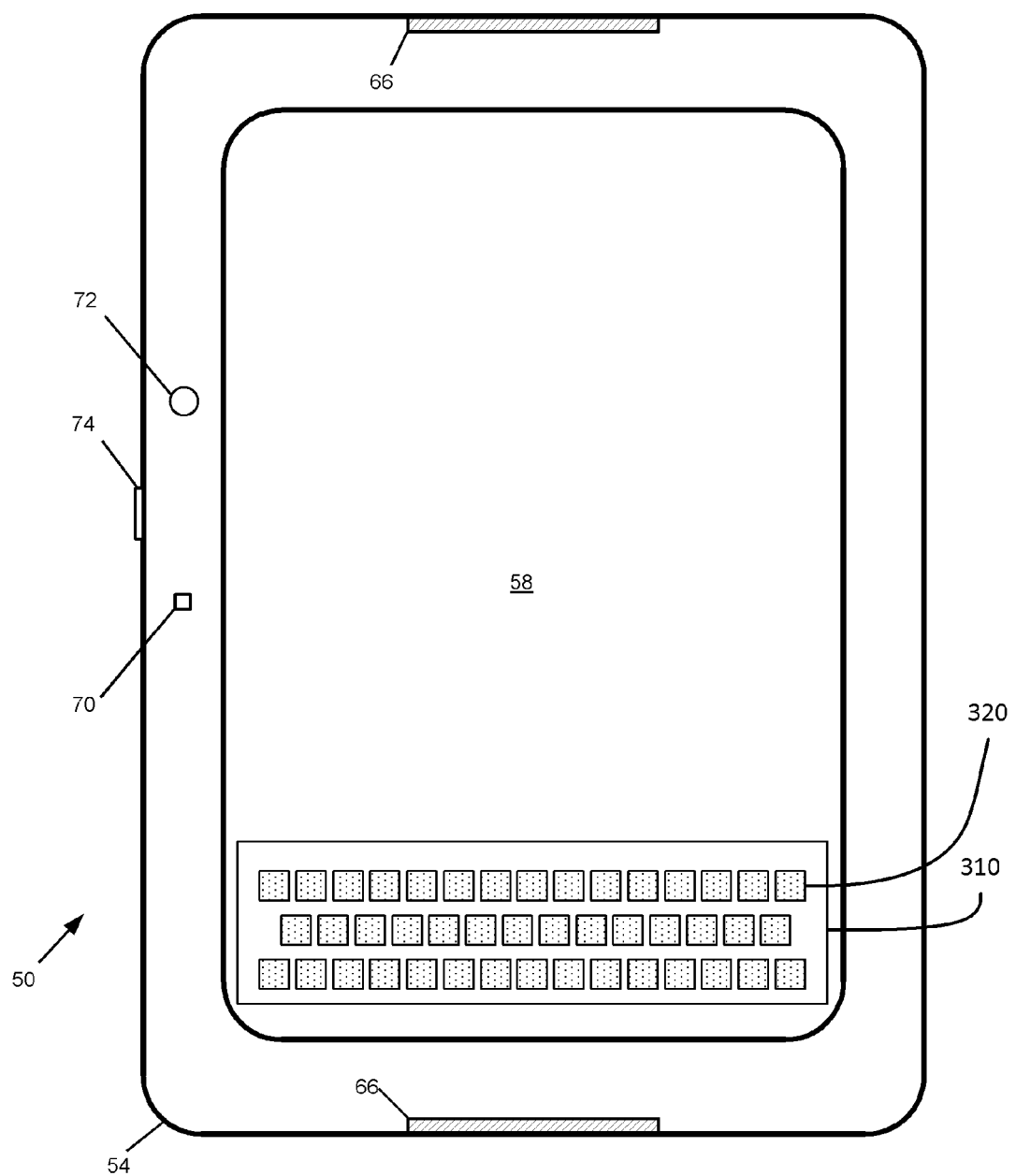
FIG. 10 is a front view of the portable electronic device with portrait orientation showing a virtual keyboard in accordance with yet another embodiment.

Referring to FIG. 10 yet another embodiment is described. In this embodiment, the portable electronic device 50 is shown with a plurality of virtual keys 320 organized in a virtual keyboard layout rendered to be displayed on the touchscreen 58 when the orientation is portrait, to form a virtual keyboard 310. It will now be appreciated, with the benefit of this specification, that in this embodiment, the first set of placement rules causes the virtual keys 320 to be organized in a virtual keyboard layout. In the present embodiment, the virtual keyboard layout is used for organizing the plurality of virtual keys 320 where each virtual key is an example of a type of input element. Each virtual key 320 is configured to receive input on the touchscreen through any suitable touchscreen mechanisms. The input from the touchscreen is then communicated via the touchscreen display interface 110 to the processor 100.

In the present embodiment, the virtual keyboard layout may include a layout similar to one that is normally found on a physical keyboard. It will now be appreciated, with the benefit of this specification, that the specific layout of a physical keyboard varies depending on the country where the keyboard is intended to be used. Furthermore, the virtual keyboard 310 may be compressed or otherwise slightly modified to allow it to fit on the touchscreen 58. During operation of the portable electronic device 58 when the orientation is portrait, the virtual keyboard 310 may appear on the touchscreen 58 when an application requests keyboard input. During periods where no keyboard input is requested, the virtual keyboard 310 may be hidden so that the keyboard does not obstruct the output rendered to be displayed on the touchscreen 58. Hiding of the virtual keyboard 310 may be initiated when an application no longer calls for any input to be received from the touchscreen 58. In addition, the virtual keyboard 310 may also be hidden after an automatic time-out indication is generated after a determined period of inactivity at the touchscreen 58.

It is to be understood that the layout of the virtual keyboard 310 is not limited to any, spacing, pitch or shape, and the depiction in FIG. 10 is purely exemplary. For example, full or reduced "QWERTY" virtual keyboard layouts are contemplated as well as other types of virtual keyboard layouts, such as "QWERTZ", "AZERTY", "QZERTY", and other layouts involving non-Latin scripts.

In addition to the virtual keys, other embodiments can have additional input elements that include control elements. For example, control element can include a navigation element, a BOLD function, and a SHIFT. Other control elements are also contemplated. In some embodiments with control elements and a virtual keyboard, the control elements can be displayed proximate the edges 90 and 92, and the keyboard can be displayed adjacent the controls Although the virtual keyboard 310 described provides a plurality of virtual keys 320 corresponding to a physical keyboard, it should now be appreciated, with the benefit of this specification, that other types of inputs may be used to provide the plurality of virtual keys 320. For example, other types of virtual keys may be application specific inputs that do not correspond to characters found on a "QWERTY" keyboard.

It will now be appreciated, with the benefit of this specification, that on a portable electronic device 50, the space available for rendering images or text is limited due to the physical size of the portable electronic device. Therefore, efforts are taken to reduce the space occupied by the virtual keyboard 310 to reduce obscuring the content under the virtual keyboard. However, in order to efficiently receive input on the virtual keyboard 310, the size and spacing between each virtual key 320 cannot be reduced so significantly that issues relating to the ability of the touchscreen 58 to distinguish the detected data representing different virtual keys 320 arise.

Figure 11:
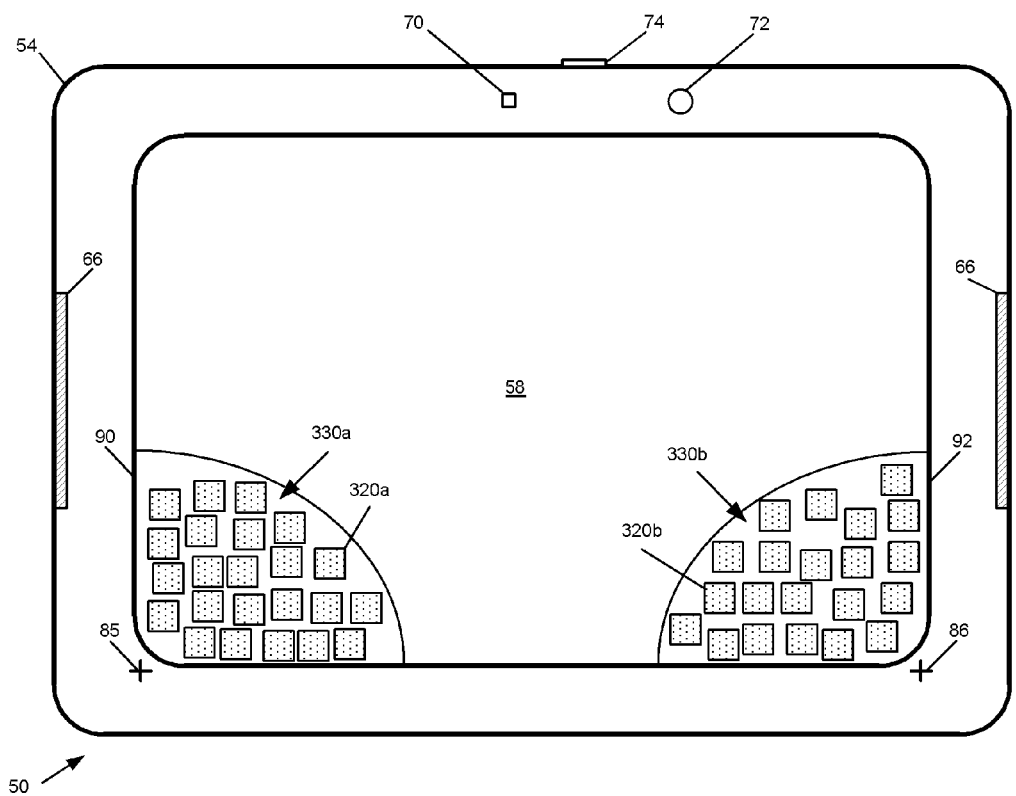
FIG. 11 is a front view of the portable electronic device with landscape orientation showing a plurality of virtual keys.

Referring to FIG. 11, the portable electronic device 50 is shown with the plurality of virtual keys 320a and 320b rendered to be displayed on the touchscreen 58 when the orientation is landscape. It should be noted that the plurality of virtual keys 320a and 320b are no longer organized in a virtual keyboard layout when the orientation is landscape. Instead, the plurality of virtual keys 320a and 320b are located proximate to opposite edges 90 and 92 of the touchscreen 58. In the embodiment shown in FIG. 11, a first set of virtual keys 320a are located in a first area 330a and a second set of virtual keys 320b are located in a second area 330b, It should be recognized that the first set of virtual keys 320a and the second set of virtual keys 320b combine to form the original set of virtual keys 320 described above. Furthermore, the first and second areas 330a and 330b are located near the two adjacent corners along the bottom of the touchscreen 58.

It should be recognized that the first and second areas 330a and 330b are also conveniently located on the face of the front of the portable electronic device 50 roughly corresponding to the grasping areas 82 and 80 respectively, which are located on the back of the portable electronic device. The grasping areas 82 and 80 are for a pair of hands to grasp the portable electronic device 50 during use. By positioning the first set of virtual keys 320a in the first area 330a and the second set of virtual keys 320b in the second area 330b, thumbs of the hands grasping the portable electronic device 50 have convenient access to all of the virtual keys 320a and 320b without requiring any repositioning of the hands which are grasping the grasping areas 82 and 80. Convenient access may be achieved by rendering the first set of virtual keys 320a and the second set of virtual keys 320b within the span of first and second thumbs without requiring any repositioning of the hands when the hands are grasping the grasping areas 82 and 80.

It will now be appreciated, with the benefit of this specification, that when the hands are grasping the portable electronic device 50, the thumbs generally have a span that can cover an area shaped approximately as a sector of a circle with a radius approximately equal to the length of the thumb. The center points 85 and 86 of the sectors are located along the opposite edges 90 and 92 of the touchscreen 58. As an example, a person with large hands may have a thumb span of about 13 centimeters. Therefore, each virtual key 320a and 320b is rendered in a location within about 13 centimeters of the points 85 and 86 respectively. In another example, a person with small hands may have a thumb span of about 10 centimeters. Therefore, each virtual key 320a and 320b is rendered in a location within about 10 centimeters of the center points 85 and 86 respectively.

In another embodiment, the portable electronic device 50 may be configured to detect the thumb span. For example, if a virtual key is consistently missed in the same direction toward one of the edges 90 and 92, the processor 100 may determine that the missed virtual key is beyond the thumb span. The processor 100 may then dynamically alter the layout by moving the virtual key closer to one of the edges 90 and 92.

As shown in FIG. 11, the center points 85 and 86 are located near the corners of the portable electronic device 50. However, it is not necessary that the center points be located at near the corners of the portable electronic device 50. In some embodiments, the center points 85 and 86 are located at another location on the edges 90 and 92 respectively. In other embodiments still, the center points 85 and 86 are located elsewhere. Furthermore, as discussed below, the first and second areas 330a and 330b need not even be a sector of a circle.

As mentioned above, it will now be appreciated, with the benefit of this specification, that on a portable electronic device 50, the space available for rendering images or text is limited due to the physical size of the portable electronic device. Therefore, by limiting the virtual keys 320a and 320b into two areas 330a and 330b, more space on the touchscreen 58 is available for rendering content. In contrast, if a full virtual keyboard were to be rendered in landscape mode, the fill keyboard would occupy more space on the touchscreen 58 which will obscure more content than the first and second areas 330a and 330b.

Figure 12:
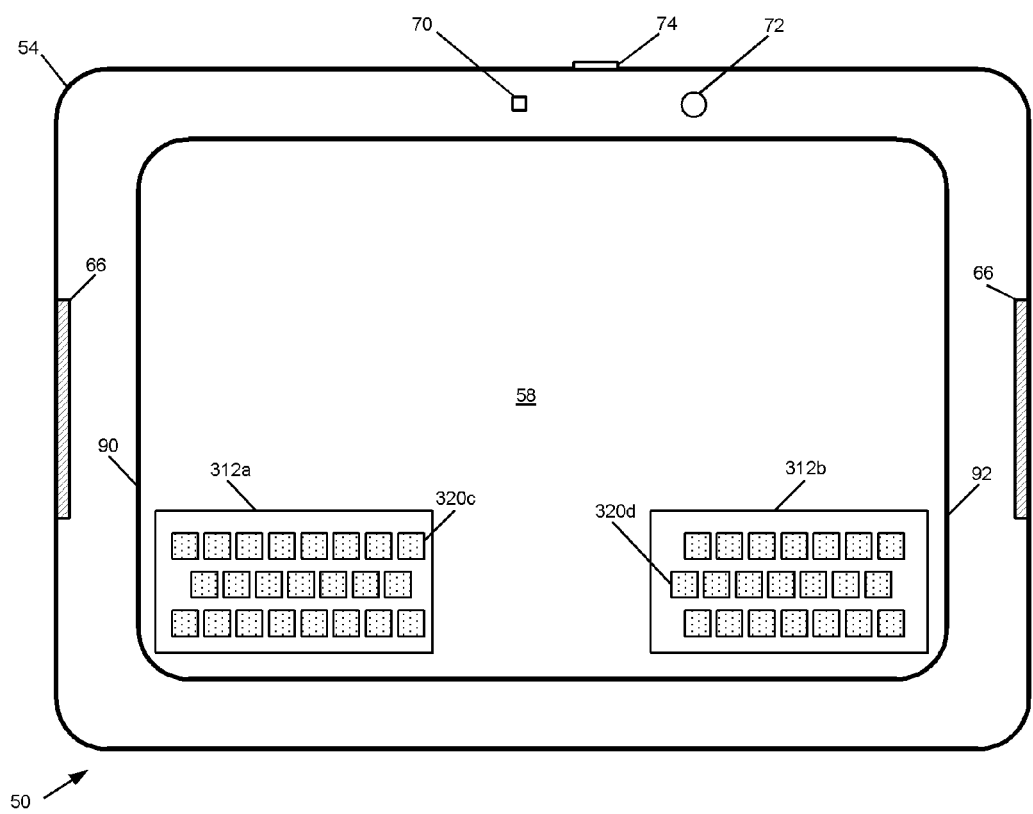
FIG. 12 is a front view of a portable electronic device with landscape orientation according to another embodiment showing portions of a virtual keyboard.

Referring to FIG. 12, another embodiment of the portable electronic device 50 is shown with the plurality of virtual keys 320c and 320d rendered on the touchscreen 58 when the orientation is landscape. It should be noted that the plurality of virtual keys 320c and 320d are organized in a layout having two separated portions of a virtual keyboard 312a and 312b. In this embodiment, a first set of virtual keys 320c are organized in a left portion of the virtual keyboard 312a and a second set of virtual keys 320d are organized in a right portion of the virtual keyboard 312b. This particular layout is advantageous as the organization of the virtual keys is semi-conventional, which provides for more efficient entry of input data on the touchscreen 58.

Figure 13:
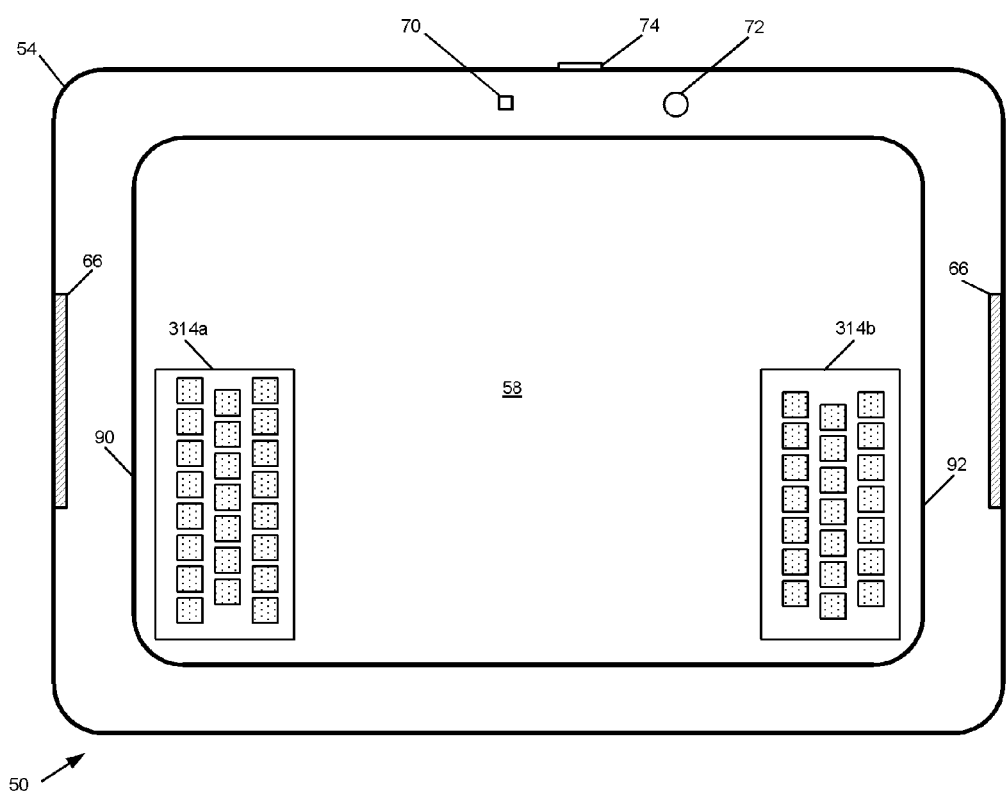
FIG. 13 is a front view of a portable electronic device with landscape orientation according to yet another embodiment showing rotated portions of a virtual keyboard.

To further emphasize the fact that different organizations for the plurality of virtual keys 320 are possible when the orientation of the touchscreen 58 is landscape, FIG. 13 shows one such other possible layout. In FIG. 13, two separated portions of a virtual keyboard 314a and 314b are oriented at 90 degrees from that shown in the embodiment described by FIG. 12.

Figure 14:
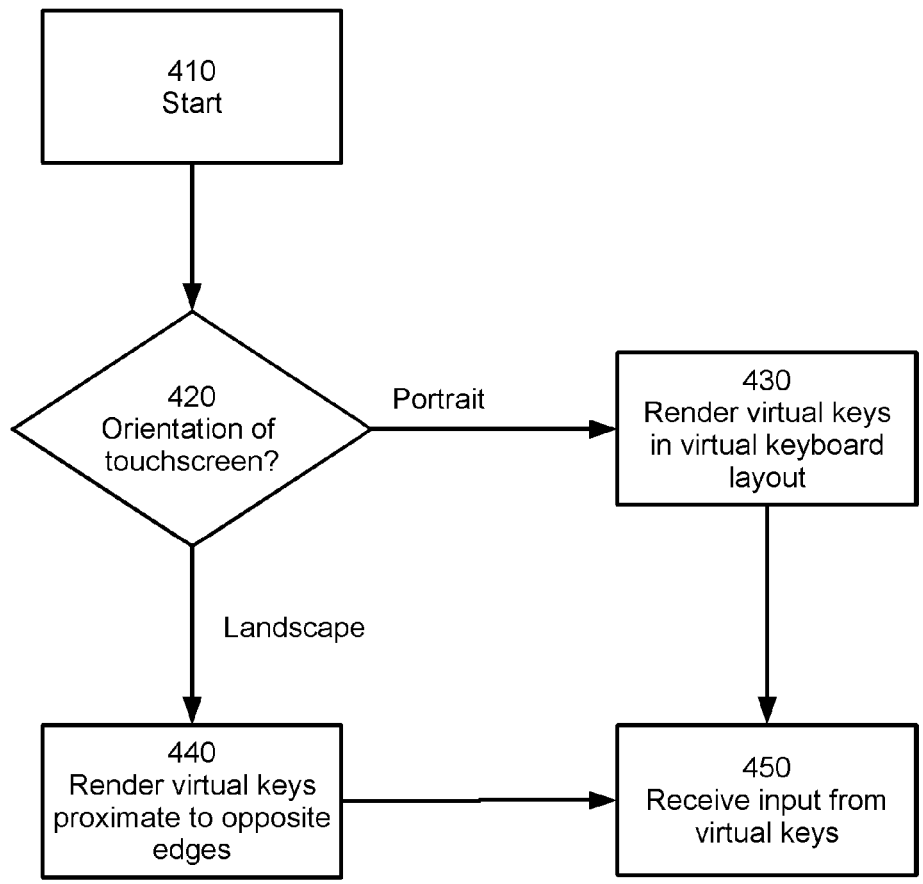
FIG. 14 is a flow chart of a method for receiving input from a portable electronic device in accordance with another embodiment.

Referring now to FIG. 14, a method for receiving input from a portable electronic device 50 is represented in the form of a flow-chart and indicated generally at 400. Method 400 can be implemented generally as part of the operating system of the portable electronic device 50 or as part of a specific application running on the portable device. Method 400 can be used to control the touchscreen 58 to generate the plurality of virtual keys 320 as discussed above in accordance with various embodiments.

Block 410 is the start of the method. The manner in which the method is started is not particularly important. For example, the method 400 may start when the portable electronic device 50 is powered on. Alternatively, the method 400 may also begin when an application is run, or at specific time intervals. It will now also be appreciated, with the benefit of this specification, that the method 400 may also be continuously running such that as soon as the prior run through the method ends, the method will start again. By continuously running method 400, the orientation of the touchscreen 58 is constantly monitored such that when a change in the orientation of the touchscreen is detected, the rendering of the plurality of virtual keys 320 will effectively be updated instantaneously. This allows for switching between two modes by simply rotating the personal electronic device 50.

Block 420 comprises determining the orientation of the touchscreen 58. This determination is made at the processor 100 after receiving input data. Input data is received by the processor 100 from the Input/Output interface 120. Input data may include data from an accelerometer 130 or other sources. A determination by the processor 100 that the orientation is portrait leads to block 430. Alternatively, a determination by the processor 100 that the orientation is landscape leads to block 440. Although the present embodiment shows only two options or the orientation (i.e. portrait and landscape), variants may include more than two options. When more options are implemented, a decision block may be added for each additional orientation supported by the portable electronic device 50. For example, FIG. 15 shows a method involving three orientations.

Referring to FIG. 15, another method for receiving input from a portable electronic device 50 is represented in the form of a flow-chart and indicated generally at 500. Block 510 is the start of the method. In contrast to the embodiment describe by FIG. 14, the portable electronic device now has three possible orientations (A, B, and C). Each orientation provides a different layout for the virtual keys 320, which for the purpose of this discussion would simply be named Layout A, B and C respectively. Block 520 comprises determining whether the orientation of the touchscreen 58 is Orientation A. A determination by the processor 100 that the orientation is Orientation A leads to block 530, which renders the virtual keys 320 to be displayed on the touchscreen 58 in accordance with Layout A. Alternatively, a determination by the processor 100 that the orientation is not Orientation A leads to block 525. Block 525 comprises determining whether the orientation of the touchscreen 58 is Orientation B. A determination by the processor 100 that the orientation is Orientation B leads to block 540, which renders the virtual keys 320 to be displayed on the touchscreen 58 in accordance with Layout B. Alternatively, a determination by the processor 100 that the orientation is not Orientation B leads to block 545, which renders the virtual keys to be displayed on the touchscreen 58 in accordance with Layout C. The method 500 then ends at block 550 where the processor 100 receives input from the virtual keys 320. It will now be appreciated, with the benefit of this specification, that this method 500 may be extended to an infinite number of orientations.

Returning to FIG. 14, Block 430 comprises rendering a plurality of virtual keys 320 organized in a virtual keyboard layout to be displayed on the touchscreen 58. Once the plurality of virtual keys 320 is rendered in the keyboard layout, the method 400 ends at block 450 where the processor 100 receives input from the virtual keys 320. Once method 400 reaches block 450, the method has been completed. In some embodiments, the method 400 includes an optional loop back to the start 410 from 450 (not shown) to provide for continuous monitoring of the orientation. Alternatively, the monitoring may occur periodically in other embodiments.

A "landscape" determination at block 420 leads to block 440. Block 440 comprises rendering the plurality of virtual keys 320a and 320b organized such that each virtual key of the plurality of virtual keys is proximate to one of two opposite edges 90 and 92 of the touchscreen 58. Once the plurality of virtual keys is rendered, the method 400 ends at block 450 where the processor 100 receives input from the virtual keys 320a and 320b. Once method 400 reaches block 450, the method has been completed. In some embodiments, the method 400 includes an optional loop back to the start 410 from 450 (not shown) to provide for continuous determination of the orientation.

Figure 16:
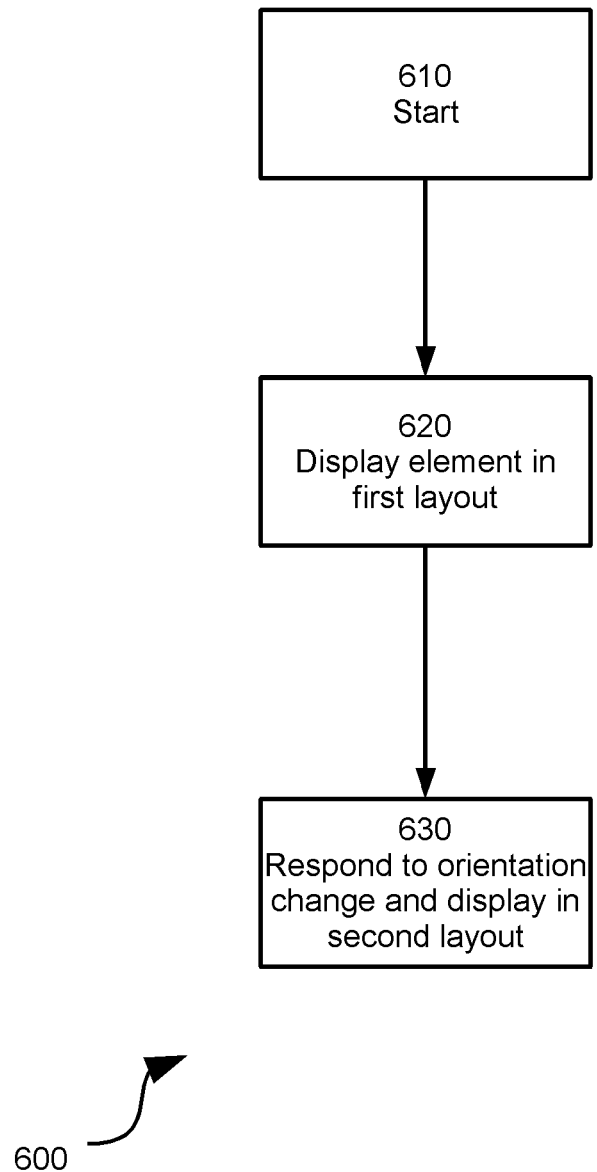
FIG. 16 is a flow chart of a method at a portable electronic device in accordance with yet another embodiment.

Referring to FIG. 16, another embodiment for a method at a portable electronic device 50 is represented in the form of a flow-chart and indicated generally at 600. Block 610 is the start of the method. Block 610 comprises displaying a touchscreen input element 302 in a first input element layout. In the event that the touchscreen 58 changes orientation, block 630 comprises responding to the change by displaying the touchscreen input element 302 in a second input element layout. For example, the touchscreen may be in a portrait orientation during block 610 and changed to a landscape orientation in block 630 (or vice versa).

Various advantages will now be apparent. Of note is that more space is freed when the orientation is landscape, such that content rendered to the touchscreen 58 is less obscured when input from the touchscreen is simultaneously requested. Since the space available in portrait mode is inherently narrower, less space is occupied by a virtual keyboard 310. Therefore maintaining a virtual keyboard 310 when the orientation is portrait allows for more efficient collection of data by the touchscreen. Furthermore, it will now be appreciated, with the benefit of this specification, that the additional resources for implementing the modified layout for virtual keys in landscape mode would not be need. Therefore, a portable electronic device 50 capable of switching between the two maximizes the use of available display space on devices with generally limited display space and improves data collection efficiency.

While specific embodiments have been described and illustrated, such embodiments should be considered illustrative only and should not serve to limit the accompanying claims.

What is claimed is:
1. A portable electronic device comprising:
 a touchscreen;
 a processor configured to:
  display a keyboard having a plurality of keys when touchscreen is in a portrait orientation;
  in response to a change to a landscape orientation of the touchscreen, display the plurality of keys in a layout having two areas shaped as sectors of a circle, the two areas having center points at opposite edges of the touchscreen.
2. The portable electronic device of claim 1, wherein the processor is configured to display control elements on the touchscreen and proximate the edges, and the processor is configured to display the keyboard adjacent the controls elements.

3. The portable electronic device of claim 1, further comprising an accelerometer configured to detect the change in orientation.

4. The portable electronic device of claim 1, wherein the processor is configured to monitor the orientation of the touchscreen.

5. The portable electronic device of claim 4, wherein the processor is configured to monitor continuously.

6. The portable electronic device of claim 4, wherein the processor is configured to monitor periodically.

7. The portable electronic device of claim 1, wherein the processor is further configured to dynamically alter the layout of keys by moving a key closer to one of the edges of the touchscreen to within a thumb span when detecting that the key is consistently missed and thus beyond the thumb span.

8. The portable electronic device of claim 1, wherein the sectors of the circle each have a radius approximately equal to the length of a user's thumb.

9. The portable electronic device of claim 8, wherein the processor is further configured to render each key at a location within about 10 centimeters of the respective center point.

10. The portable electronic device of claim 1, wherein the center points are located near corners of the portable electronic device.

11. A method at a portable electronic device having a touchscreen, the method comprising:
when the touchscreen is in a portrait orientation, displaying a keyboard having a plurality of keys; and
in response to a change to a landscape orientation of the touchscreen, displaying the plurality of keys in a layout having two areas shaped as sectors of a circle, the two areas having center points at opposite edges of the touchscreen.

12. The method of claim 11, further comprising displaying control elements on the touchscreen and proximate the edges, the keyboard being displayed adjacent the control elements.

13. The method of claim 11, wherein the change in orientation is detected with an accelerometer.

14. The method of claim 11, further comprising monitoring the orientation of the touchscreen.

15. The method of claim 14, wherein the orientation is monitored continuously.

16. The method of claim 14, wherein the orientation is monitored periodically.

17. The method of claim 11, further comprising dynamically altering the layout of keys by moving a key closer to one of the edges of the touchscreen to within a thumb span when detecting that the key is consistently missed and thus beyond the thumb span.

18. The method of claim 11, wherein the sectors of the circle each have a radius approximately equal to the length of a user's thumb.

19. The method of claim 18, further comprising rendering each key at a location within about 10 centimeters of the respective center point.

20. The method of claim 11, wherein the center points are located near corners of the portable electronic device.

21. A non-transitory computer readable medium encoded with codes, the codes for directing a processor to:
display a keyboard having a plurality of keys on a touchscreen when the touchscreen is in a portrait orientation; and
in response to a change to a landscape orientation of the touchscreen, display the plurality of keys in a layout having two areas shaped as sectors of a circle, the two areas having center points at opposite edges of the touchscreen.

* * * * *